United States Patent
Cooper

(10) Patent No.: US 9,921,399 B2
(45) Date of Patent: Mar. 20, 2018

(54) SYSTEM AND METHOD FOR CONTINUOUS, ASYNCHRONOUS AUTOFOCUS OF OPTICAL INSTRUMENTS

(71) Applicant: General Electric Company, Schenectady, NY (US)

(72) Inventor: Jeremy Cooper, Issaquah, WA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 124 days.

(21) Appl. No.: 14/675,199

(22) Filed: Mar. 31, 2015

(65) Prior Publication Data

US 2016/0291307 A1   Oct. 6, 2016

(51) Int. Cl.

| | |
|---|---|
| G02B 21/24 | (2006.01) |
| G02B 21/02 | (2006.01) |
| G02B 21/06 | (2006.01) |
| G02B 7/38 | (2006.01) |
| G02B 27/10 | (2006.01) |
| G02B 27/14 | (2006.01) |

(52) U.S. Cl.
CPC ............. *G02B 21/245* (2013.01); *G02B 7/38* (2013.01); *G02B 21/02* (2013.01); *G02B 21/06* (2013.01); *G02B 27/106* (2013.01); *G02B 27/145* (2013.01); *G02B 27/148* (2013.01)

(58) Field of Classification Search
CPC ....... G02B 21/02; G02B 21/06; G02B 21/245
See application file for complete search history.

(56) References Cited

U.S. PATENT DOCUMENTS

| | | | |
|---|---|---|---|
| 5,144,606 A | 9/1992 | Kadowaki | |
| 5,151,889 A | 9/1992 | Saimi et al. | |
| 5,337,300 A | 8/1994 | Takishima et al. | |
| 6,471,388 B1 | 10/2002 | Marsh | |
| 7,071,451 B2 | 7/2006 | Ishikawa et al. | |
| 7,297,910 B2 | 11/2007 | Fomitchov | |
| 7,473,877 B2 | 1/2009 | Fomitchov | |
| 8,362,409 B2 | 1/2013 | Cooper et al. | |
| 8,558,154 B2 | 10/2013 | Cooper et al. | |
| 8,759,732 B2 | 6/2014 | Cooper et al. | |
| 2003/0112504 A1* | 6/2003 | Czarnetzki | G02B 21/006 359/383 |

(Continued)

OTHER PUBLICATIONS

International Search Report and Written Opinion regarding International Application No. PCT/US2016/021329, dated May 19, 2016, 8 pages.

*Primary Examiner* — Francis M Legasse, Jr.
(74) *Attorney, Agent, or Firm* — Rong Zhang

(57) ABSTRACT

Embodiments of the present invention are directed to autofocus subsystems within optical instruments that continuously monitor the focus of the optical instruments and adjust distances within the optical instrument along the optical axis in order to maintain a precise and stable optical-instrument focus at a particular point or surface on, within, or near a sample. Certain embodiments of the present invention operate asynchronously with respect to operation of other components and subsystems of the optical instrument in which they are embedded. In one embodiment the autofocus detector comprises a beam splitter arranged to split the autofocus light beam into a plurality (n) of down-stream light beams and a photodetector arrangement for registering the intensity of each one of the down-stream light beams.

22 Claims, 19 Drawing Sheets

(56) References Cited

U.S. PATENT DOCUMENTS

| | | | |
|---|---|---|---|
| 2010/0133417 A1* | 6/2010 | Nagahama | G02B 7/36 |
| | | | 250/201.4 |
| 2010/0165621 A1 | 7/2010 | Hoffend, Jr. et al. | |
| 2011/0309231 A1* | 12/2011 | Cooper | G02B 21/245 |
| | | | 250/201.2 |
| 2013/0013429 A1 | 5/2013 | Mooney et al. | |

* cited by examiner

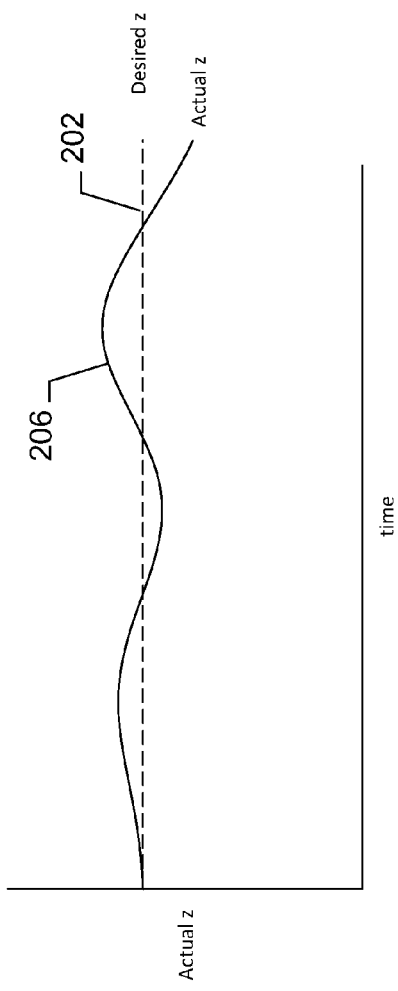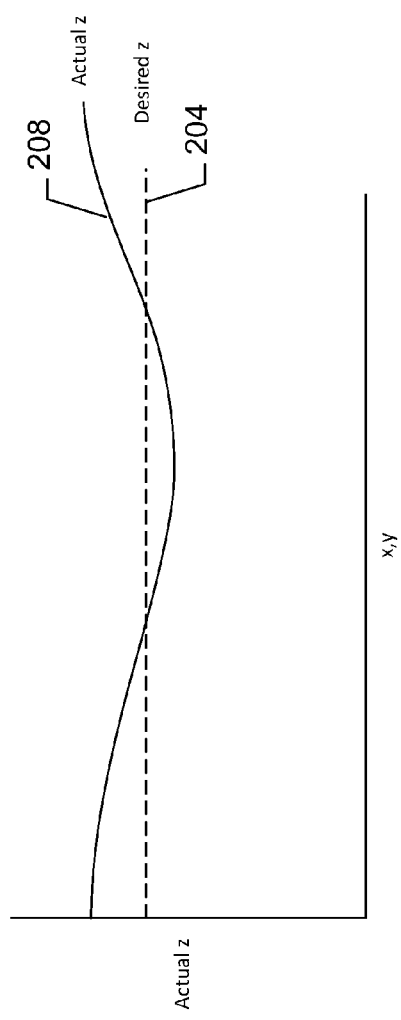
FIGURE 2A
FIGURE 2B

SYSTEM AND METHOD FOR CONTINUOUS, ASYNCHRONOUS AUTOFOCUS OF OPTICAL INSTRUMENTS

TECHNICAL FIELD

The present invention is related to optical instruments and, in particular, to a continuous, asynchronously operating autofocus subsystem within an optical instrument that maintains a constant distance along the optical axis between an objective lens and a point or surface on, within, or near an imaged object.

BACKGROUND

While optical microscopy and other optics-based methods have been exploited in many domains of human activity, from scientific research to warfare, for many hundreds of years, the advent of microprocessors, modern computing, and molecular biology have given rise to an ever-accelerating development of new optical instrumentation and optical-imaging technologies. For example, fluorescent tagging of proteins within living cells, combined with computational facilities incorporated in modern fluorescence-microscopy instrumentation allows fine detail of biological components of living cells to be imaged at resolutions significantly lower than the so-called "diffraction limit" for optical microscopy.

Many new optical instruments, applications of optical instruments, and optical-imaging technologies depend on precise focusing of high-powered optical systems with shallow depths of focus over prolonged periods of time and/or during scanning of imaged objects within the x-y plane orthogonal to the optical z axis. Examples include various optical-microscopy techniques that achieve below-diffraction-limit resolution by imaging weakly emitting fluorophores in biological samples over relatively long periods of time and optical-microscopy techniques for scanning living cells and other biological samples to image planes within these samples by translating the samples in the x-y plane with respect to the optical path of the microscope while maintaining a constant z position. The focus of optical instruments may vary, over time, as a result of thermal and electromechanical instabilities, for example, and even very precise electromechanical microscope stages may fluctuate, in distance with respect to imaging optics, as the stage is translated in the x-y plane while scanning samples or while collecting data from samples over periods of time. Designers, manufacturers, and users of precision optical instrumentation continue to seek systems and methods that stabilize the focus of high-precision optical instruments over time and while the various subcomponents of the high-precision optical instruments, including electromechanical stages, are operating.

SUMMARY

Embodiments of the present invention are directed to autofocus subsystems within optical instruments that continuously monitor the focus of the optical instruments and adjust distances within the optical instrument along the optical axis in order to maintain a precise and stable optical-instrument focus at a particular point or surface on, within, or near a sample. Certain embodiments of the present invention operate asynchronously with respect to operation of other components and subsystems of the optical instrument in which they are embedded.

BRIEF DESCRIPTION OF THE DRAWINGS

FIGS. 2A-B show the undesirable variation in the position of the focal point of the objective lens with respect to the optical axis, or z position, within a sample, over time, in the case of FIG. 2A, or during x and/or y translation of the sample, in the case of FIG. 2B.

DETAILED DESCRIPTION

Figure 1A:
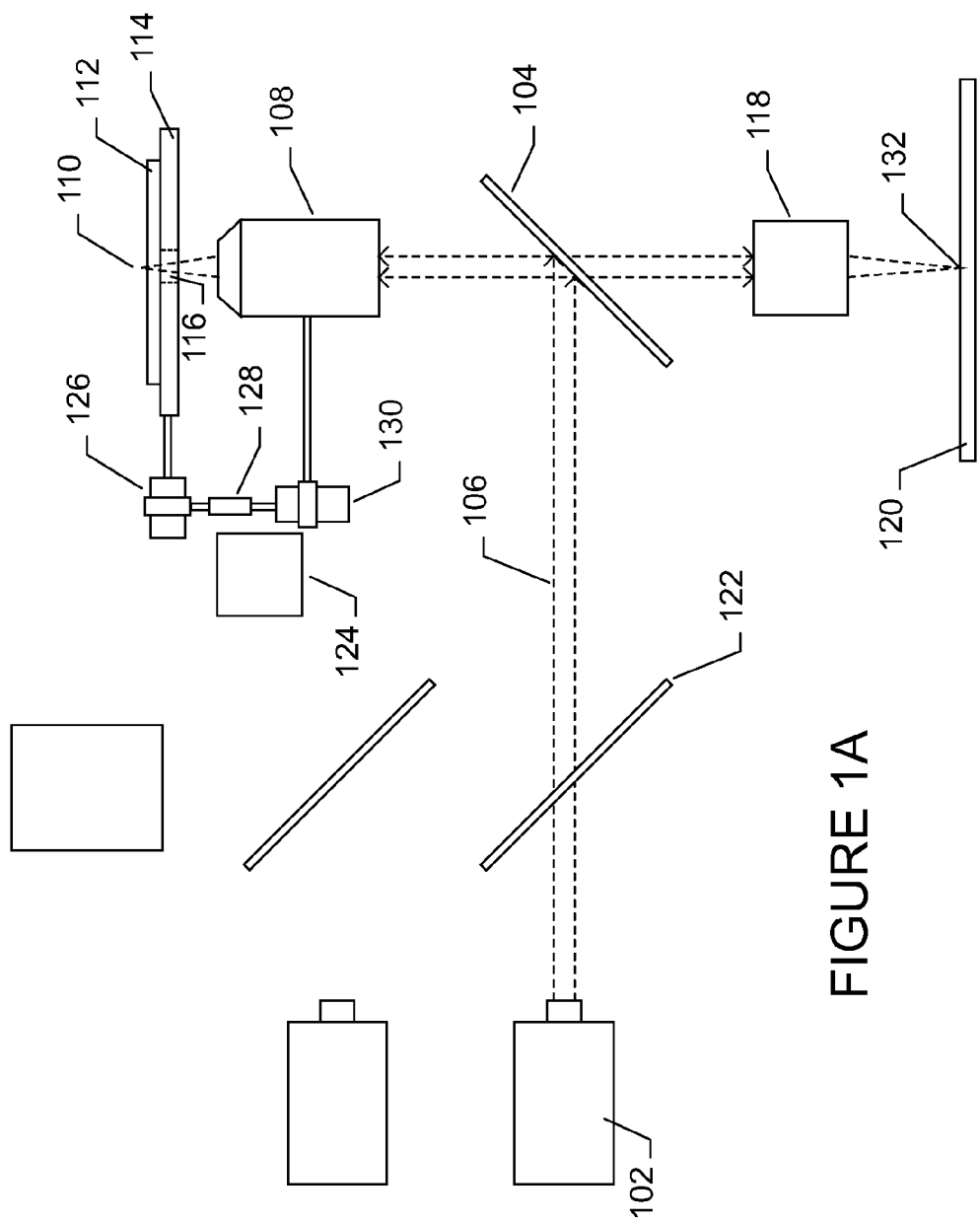
FIGS. 1A-C illustrate the optical path within a fluorescence microscope.
Figure 1B:
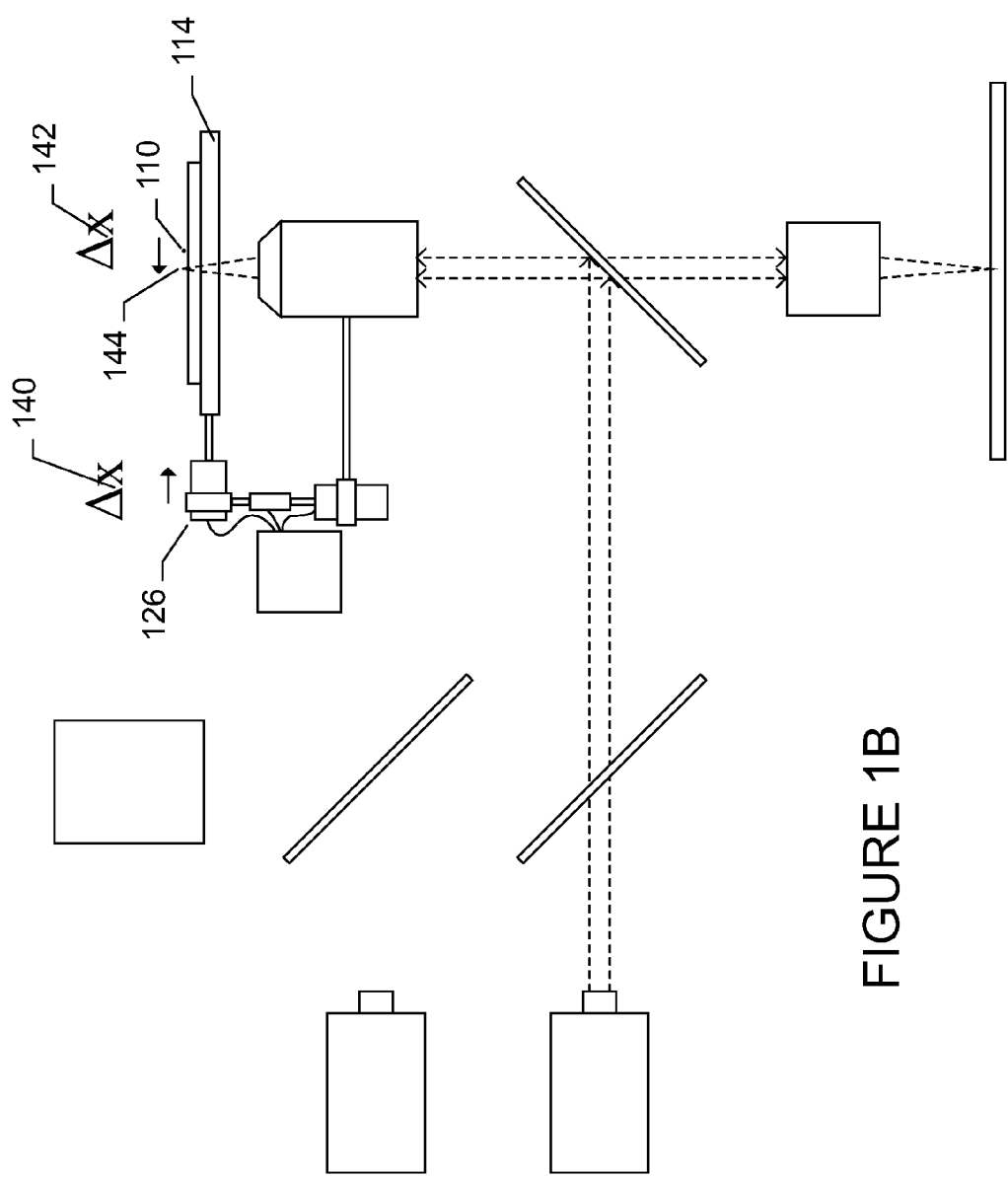
Figure 1C:
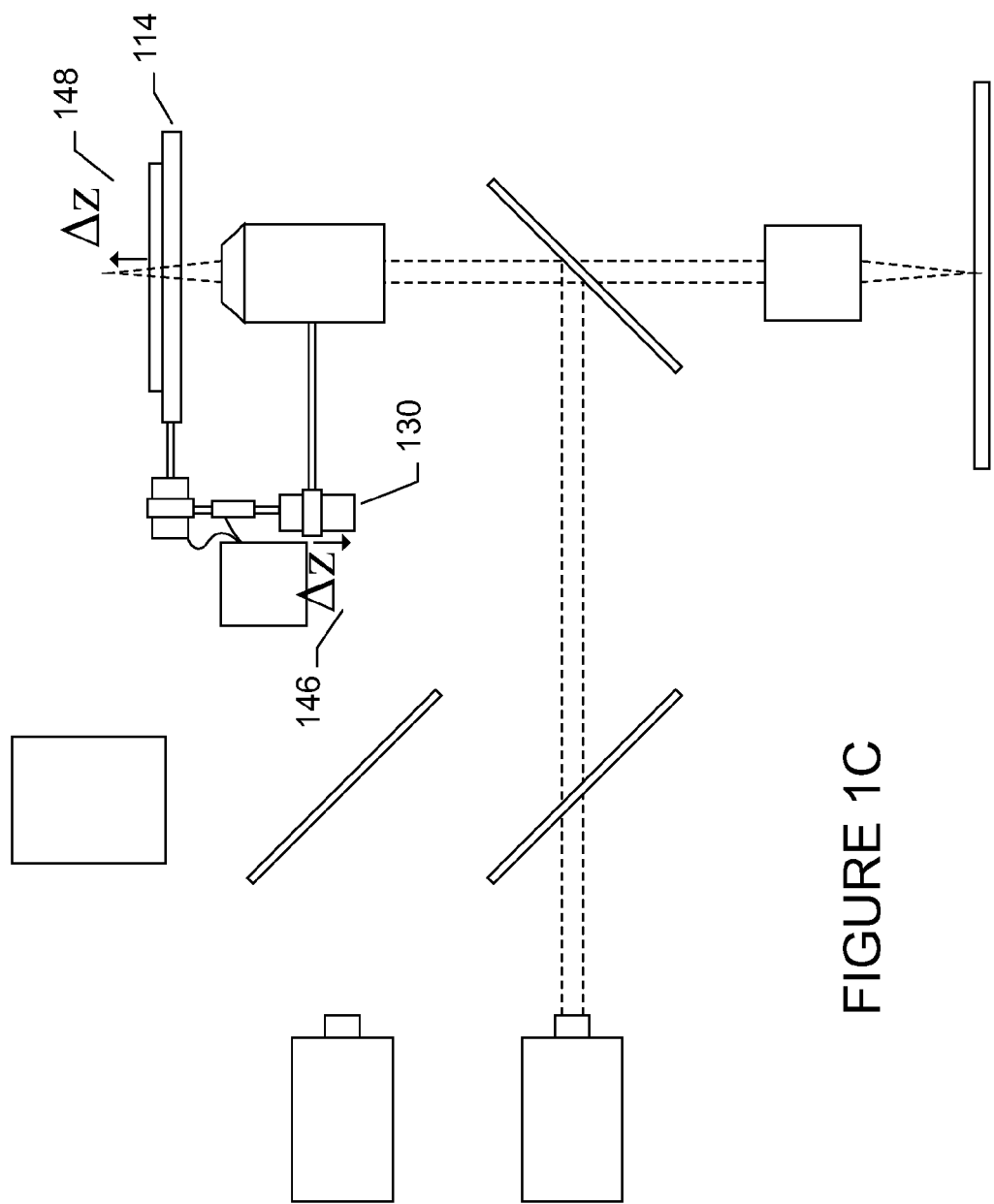

FIGS. 1A-C illustrate the optical path within a fluorescence microscope. The optical path, and the fluorescence microscope that contains the optical path, serve as a context for describing one embodiment of the present invention. However, as also noted below, the methods and systems of the present invention may be incorporated within a wide variety of different types of optical instruments, in many cases by adjusting various parameters and configurations of the embodiments of the present invention for use in particular applications.

The optical path of the fluorescence microscope includes an excitation-light source 102, generally a visible-light or UV-light laser, a polychroic mirror 104 that reflects the excitation light 106 into the objective lens or lenses 108, which focus the excitation light onto a point 110 within a sample resting on the far side of a cover slip 112 that lays on a mechanical-stage platform 114 with an aperture 116 through which the excitation light passes. The excitation light stimulates fluorescent emission from fluorophores within the sample. The emitted light from the fluorophores, generally with a longer wavelength than that of the excitation light, passes back through the objective lens or lenses 108 and through the polychroic mirror 104 to one or more tube lenses 118 that focus the light emitted by the fluorophores onto a photodetector 120, often a charge-coupled-device ("CCD") detector. Spatial intensities measured by the photodetector are electronically processed by computing subsystems to generate images of the imaged object which are stored in electronic memories and mass-storage devices and rendered for display on electronic display devices.

The polychroic mirror 104 reflects light of shorter wavelength, including the excitation light, and may also reflect light of very long wavelength, such as infrared light, but is transparent to visible light within a range of wavelengths that includes the wavelengths of light emitted by fluorophores within fluorophore-labeled samples. Similarly, a dichroic mirror 122 on the initial path of the excitation light 106 is transparent to the relatively short-wavelength excitation light, but reflects longer-wavelength infrared light, as discussed in greater detail below. The electromechanical stage that includes the stage platform 114, a stage-drive component 124 and x 126, y 128, and z 130 translation mechanisms is used to move the sample, in x, y, and z directions, with respect to the objective lens and instrument optical path. Note that the optical, or z, axis is parallel with the light path that extends vertically, in FIG. 1A, from the sample point 110 through the objective lens, polychroic mirror, and tube lens to a corresponding image point 132 on the detector 120.

In FIG. 1B, the x translation mechanism 126 has been activated to move the stage platform 114 rightward by a small distance +Δx 140, which results in an equal magnitude, but opposite shift −Δx 142 of the focal point within the sample in the x direction. The previous focal point 110 and new focal point 144 are, in other words, separated by a distance of magnitude |Δx| 142 following translation of the stage platform by a distance +Δx in the x direction. FIG. 1C shows, in a fashion similar to FIG. 1B, activation of the z translation apparatus 130 to move the mechanical stage 114 by small distance −Δz 146 in the z, or optical-axis, direction, resulting in a translation of the focal point within the sample by a distance +Δz of equal magnitude 148, but opposite direction. In this discussion, it is assumed that the distance between the detector 120 and tube lens 118, shown in FIG. 1A, is fixed, at least over a period of time during image acquisition from a sample, therefore fixing the focal point of the objective lens.

In many fluorescence-microscopy applications, including live-cell imaging, acquisition of high-resolution images depends on imaging a particular sample in a fixed position with respect to the objective lens for a period of time sufficient to collect adequate information from weakly emitting fluorophores for reconstructing images of the fluorophore labels within the sample. In other applications, a sample is scanned, by moving the electromechanical stage in the x-y plane relative to the objective lens, while maintaining a constant focus, or constant distance between the objective lens and the sample in the z, or optical-axis, direction. In both cases, the distance between the objective lens and a point or surface within the sample needs to be maintained at a precise-fixed value over a period of time and/or while the mechanical stage is translated in the x and y directions.

FIGS. 2A-B show the undesirable variation in the position of the focal point of the objective lens with respect to the optical axis, or z position, within a sample, over time, in the case of FIG. 2A, or during x and/or y translation of the sample, in the case of FIG. 2B. In both figures, a desired distance between the objective lens and sample is indicated by a dashed line 202 and 204. The actual distance between the objective lens and the sample is shown, in both figures, as a solid curve 206 and 208. Despite best efforts to maintain a fixed distance between the objective lens and a point or surface within the sample, the actual distance between the objective lens and sample, in the z, or optical-axis, direction varies over time and during x and/or y translation. These variations have many different causes. Thermal instability in the microscope environment can result in expansion or contraction of the optical instrument in directions with z-axis components, for example. Optical instruments are often surrounded by temperature-control chambers, but components of the optical instrument may generate and dissipate heat, including light sources, motors, and other such components, which cannot be immediately compensated for. Fluctuations in air pressure and other environmental parameters may also result in variations in the distance between the objective lens and sample. When the x-y plane of the electromechanical stage is oriented even slightly non-orthogonally to the optical axis, during scanning by translation in the x-y plane, the sample also moves in the z direction relative to the objective lens.

Figure 3:
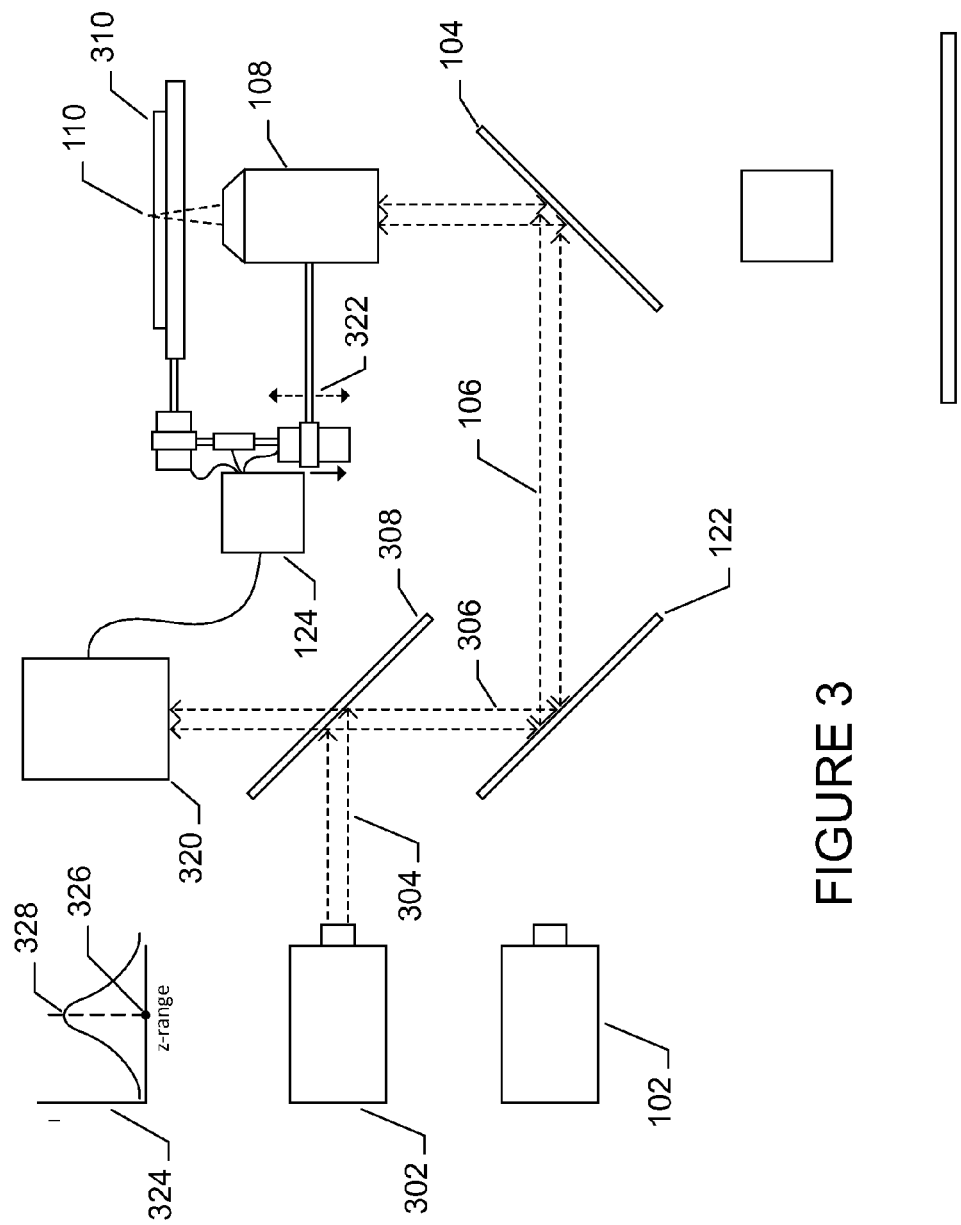
FIG. 3 illustrates a traditional autofocus subsystem of a microscope.

FIG. 3 illustrates a traditional autofocus subsystem of a microscope. Autofocus subsystems have been developed to stabilize focal-point location with respect to the optical axis within a sample over time and while the sample is moved in the x-y plane. FIG. 3 uses the same illustration conventions as used in FIGS. 1A-C. The autofocus subsystem shown in FIG. 3 uses a different autofocus-light source 302 than the excitation light source 102. In many systems, the autofocus-light source emits infrared light 304, a portion of which is reflected downward 306 by a beamsplitter 308 to the dichroic mirror 122, which reflects the infrared light in a horizontal direction 106 in FIG. 3, along the same optical path as that taken by light emitted by the excitation source 102, from which the infrared light is reflected, by the polychroic mirror 104, through the objective lenses 108 to the sample 110. The infrared light is scattered at the interface between the far side of the cover slip 310 and the sample media, and a portion of the backscattered infrared light returns through the objective lens 108 and optical-path elements 104, 122, and 308. A portion of the backscattered infrared light passes through the beamsplitter 308 to an autofocus module 320. Additionally, the positions of the autofocus light source 302 and autofocus detector module 320 can be reversed about the beam splitter 308 with equivalent results, and the relative positions of the illumination source and autofocus light source may be changed, along with changes in the characteristics of other optical-path components, in various alternative configurations. It should be noted that the phrase "cover slip" is intended to include both traditional cover slips often employed in microscopy as well as surfaces of any of a large variety of different types of sample-chamber and sample-holding devices. Any of various interfaces that have fixed positions relative to the sample can be used as a source for backscattered autofocus light in order to detect and correct z-position dislocations of sample planes with respect to one or more objective lenses.

The autofocus module 320 periodically controls the stage drive 124 to translate the stage along the optical axis over a range of z-axis positions 322 and records the intensity of light at each z-axis position, at least conceptually generating an intensity versus z-position plot 324. The z position within the z range corresponding to coincidence of the focal point of the objective lens with the far side of the cover slip is indicated by the z position 326 underlying the peak 328 of the intensity curve, since the highest intensity of backscattered light occurs when the distant side of the cover slip coincides with the focal point of the objective lens. There are a variety of different types of autofocus modules that carry out periodic z-axis scans in order to determine a current z-axis position of the stage platform at which the interface of the cover slip and sample media coincides with the focal point of the optical instrument. The autofocus module can then drive the electromechanical stage to a desired z-axis position relative to the determined z-axis position of the focal point, in order to reposition the focal point at a desired z-axis position within the sample.

Figure 4:
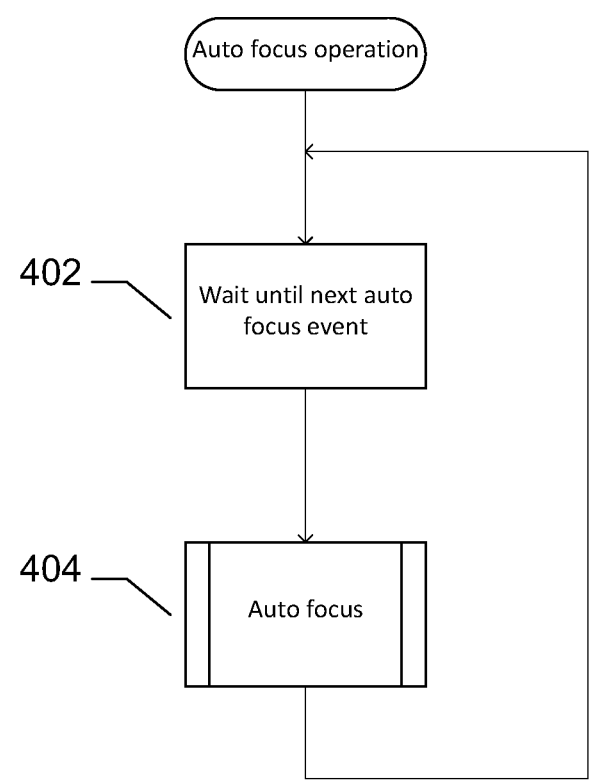
FIGS. 4 and 5 provide control-flow diagrams that illustrate operation of traditional autofocus modules.
Figure 5:
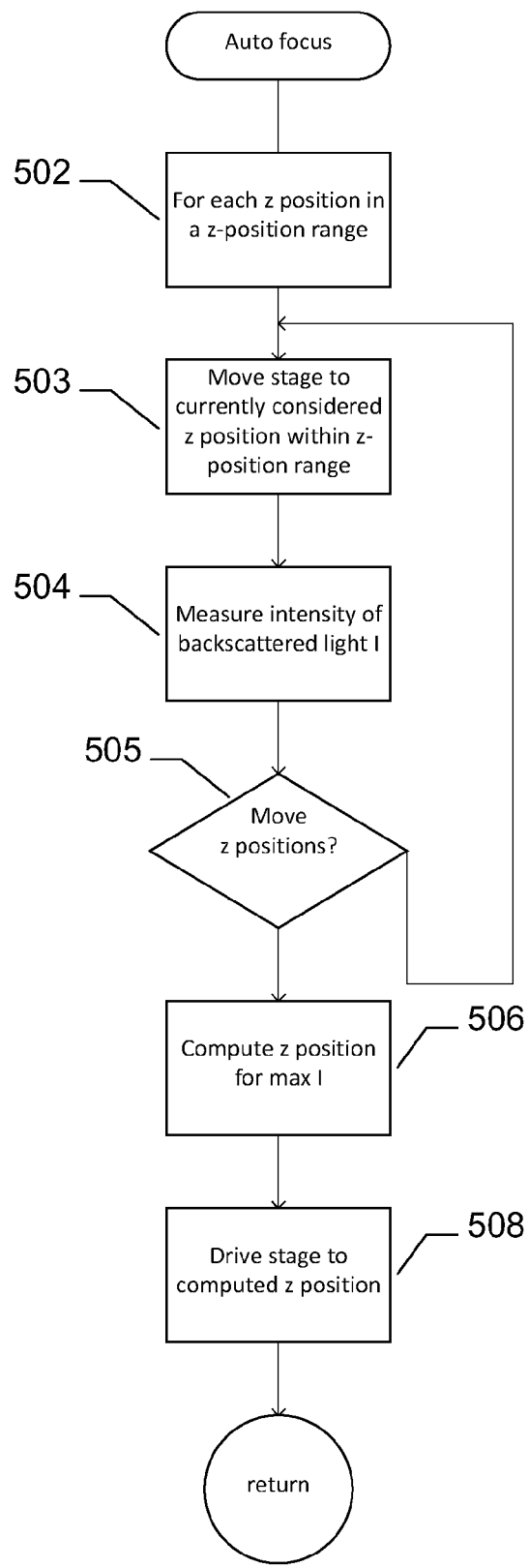

FIGS. 4 and 5 provide control-flow diagrams that illustrate operation of traditional autofocus modules. FIG. 4 provides a high-level control-flow diagram of a traditional autofocus operation. The autofocus operation is a continuous loop comprising steps 402 and 404. In step 402, the autofocus operation waits until a next autofocus event occurs, such as expiration of an autofocus timer or manual input from an optical-instrument operator that invokes a next autofocus operation. Then, in step 404, the routine "autofocus" is called to carry out a scan over a range of z positions, as discussed above with reference to FIG. 3, in order to determine a current z position at which the focal point of the objective lens coincides with the far interface of the cover slip with sample media. Although the autofocus operation is shown in FIG. 4 as a continuous loop, it should be noted that the actual autofocus operation, represented by the call to the routine "autofocus," occurs at discrete intervals in time, and that the autofocus operation is disruptive, generally interrupting other operations involving imaging or translation of the electromechanical stage.

FIG. 5 provides a control-flow diagram for the routine "autofocus," called in step 404 of FIG. 4. In a for-loop of steps 502-505, the autofocus module controls the stage drive to scan through a range of z positions. For each z position within the range, the autofocus module drives the mechanical stage to the z position, in step 503, and measures the intensity of backscattered autofocus light, in step 504. Once the backscattered-autofocus-light intensities are measured for each position within the range of z positions, in the for-loop of steps 502-505, the routine "autofocus" computes the z position corresponding to the maximum intensity of backscattered light, in step 506, and then, in step 508, drives the mechanical stage to a z position computed with respect to the z position computed in step 506. For example, it may be desired that the focal point be maintained at a constant z position of 10 microns within the sample, and so the autofocus computes a z position equal to 10 microns plus the current z position at which the optical instrument is focused on the far side of the cover slip, in step 508, and drives the electromechanical stage to that position.

Traditional or conventional autofocus subsystems, such as those discussed above with reference to FIGS. 3-5, are associated with many problems and deficiencies. One significant problem is that operation of the autofocus subsystem, as noted above, interrupts whatever other operations are being performed by the optical instrument. For example, when the optical instrument is conducting an x-y-plane scan of a sample, at fixed z position, each autofocus operation interrupts the scan in order to monitor the stability of the z position during the scan. The z-axis scan employed for autofocusing may add significant time to the time needed to acquire an image. A second deficiency associated with traditional autofocus subsystems is that, since the autofocus operation is carried out at discrete intervals in time, the z axis position of the instrument may drift, between autofocus intervals. Decreasing the interval between autofocus operations, in order to minimize z-axis drift, results in further increase in data-collection times. Yet another problem associated with autofocus operations is that, since the autofocus operation itself is carried out, over time, by moving the electromechanical stage through a range of z positions, instrument and environmental instabilities may change during the autofocus operation, significantly decreasing the accuracy at which the instrument focal point position can be determined and z-axis drift corrected.

Figure 6:
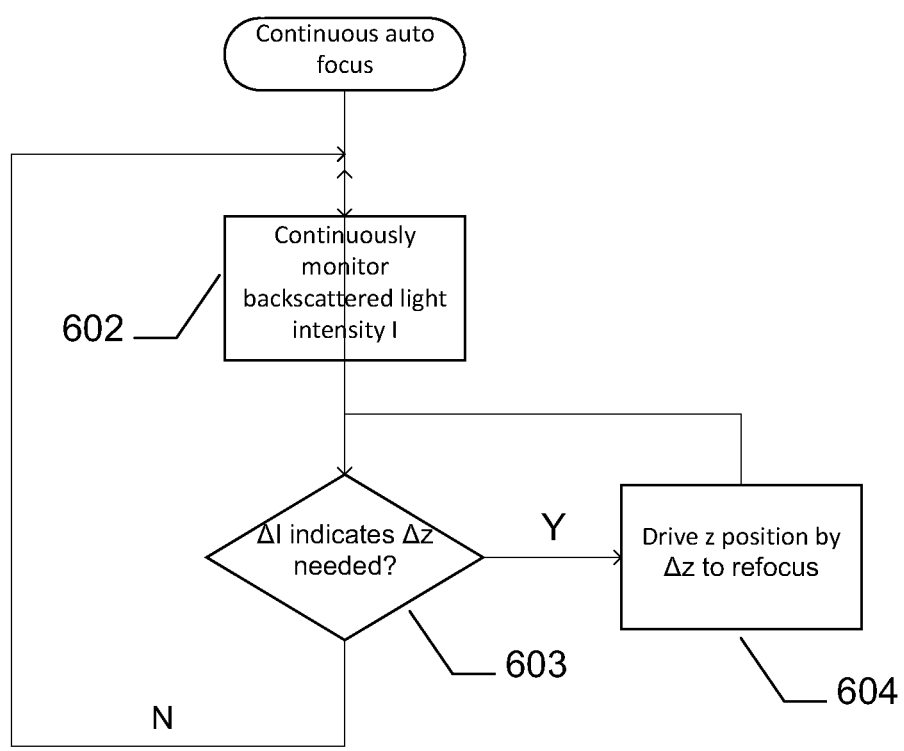
FIG. 6 provides a control-flow diagram that illustrates one aspect of certain embodiments of the present invention.

Embodiments of the present invention are directed to a continuously operating, rapid autofocus module that operates asynchronously with respect to operation of other optical-instrument components and subsystems, including translations of the electromechanical stage and image-acquisition operations. The principles of some embodiments of such asynchronous autofocus systems are presented in U.S. Pat. No. 8,362,409, U.S. Pat. No. 8,558,154 and U.S. Pat. No. 8,759,732 which are incorporated herein by reference. FIG. 6 provides a control-flow diagram that illustrates the principles of an asynchronous autofocus system according to said disclosures. The continuous, asynchronous autofocus operation is represented by a continuously executing loop of steps 602-604. In step 602, the z-axis position of the interface between the cover slip and sample media is continuously monitored, in one embodiment, by computing the z-axis position at which backscattered light from this interface produces highest intensity. When the z-axis position of the interface relative to the objective lenses changes, or when another z-axis position relative to the objective lenses changes, the electromechanical stage is drive through a small correction distance $\Delta z$, in step 604, to maintain a constant distance between the objective lens and a particular point or surface within a sample. Because the autofocus module continuously operates, without interrupting operation of other components of an optical instrument, data-collection times are not impacted, and the focus of the optical instrument can be maintained more stably and with greater precision over time than by traditional autofocus modules. Because the autofocus module continuously and rapidly recomputes the z-axis position of the far interface of the cover slip with sample media, the z-axis position of the objective lens relative to the interface of the cover slip can be continuously determined with greater accuracy than by traditional autofocus modules, since the amount of time needed for each autofocus operation is much smaller than in traditional autofocus modules, and therefore the maximum amount of drift that can occur during the autofocus operation is less, in the described embodiments of the present invention, than in traditional autofocus modules.

Figure 7A:
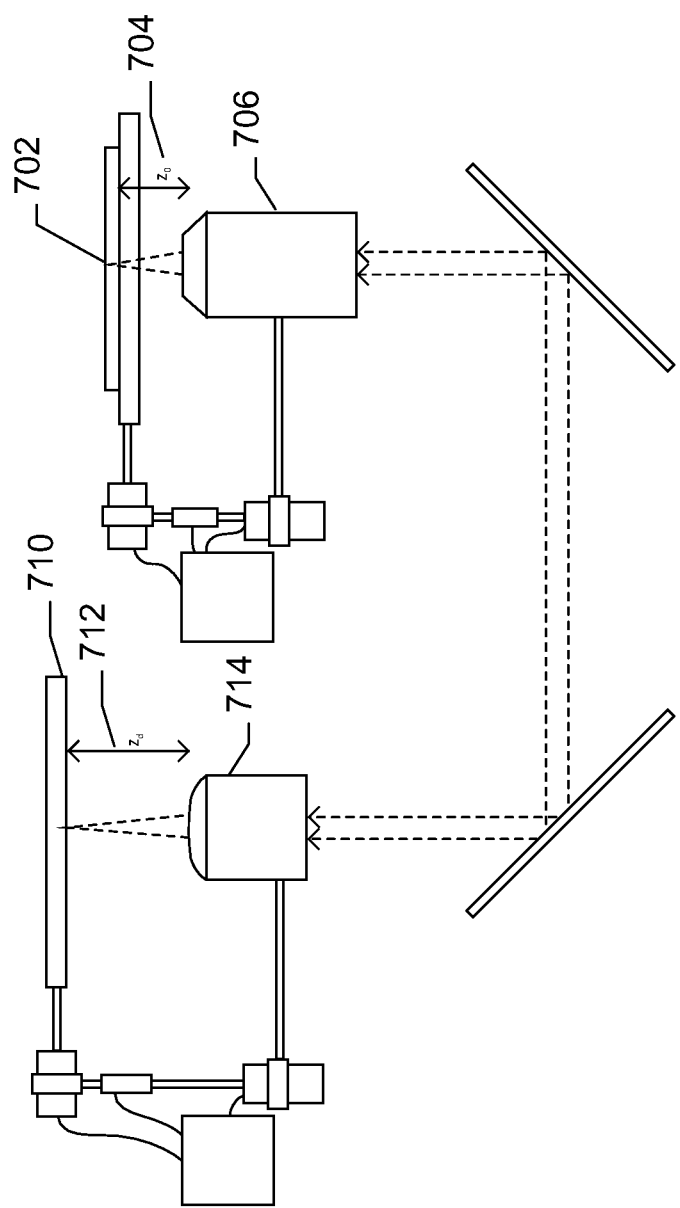
FIG. 7A-C illustrate a z-axis scan independent from the electromechanical stage of the fluorescence microscope discussed above with reference to FIGS. 1A-C and FIG. 3.
Figure 7B:
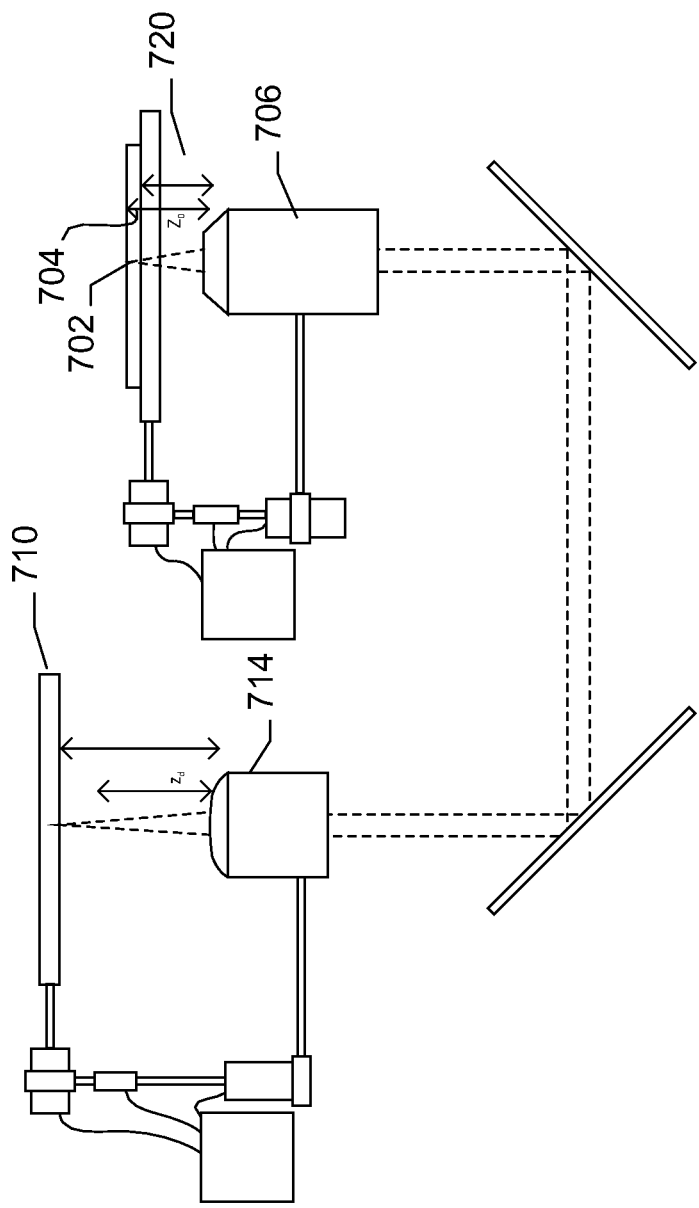
Figure 7C:
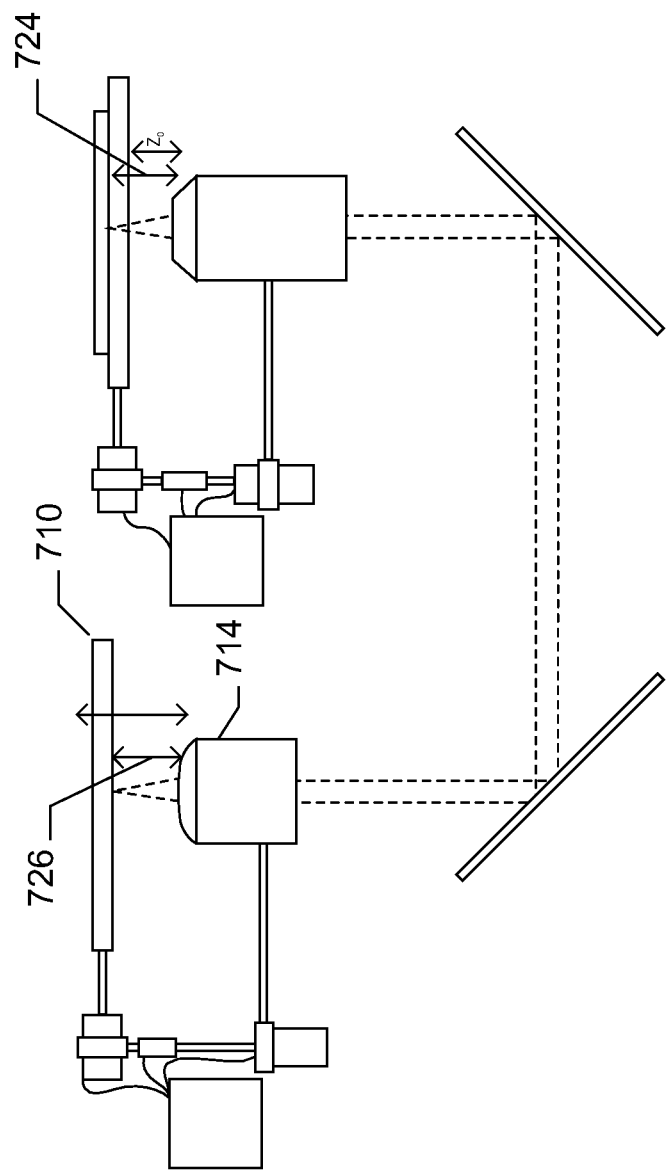

FIG. 7A-C illustrate a z-axis scan independent from the electromechanical stage of the fluorescence microscope discussed above with reference to FIGS. 1A-C and FIG. 3. FIGS. 7A-C illustrate a hypothetical system, similar to that shown in FIGS. 1A-C and 3, in which a detector within an autofocus module can be moved relative to a tube lens at the same time that a sample is moved relative to the objective lens in the z direction. In FIG. 7A, a point on the inner interface of the cover slip is held at a particular z-axis position $z_0$ 704 from the objective lens or lenses 706. Backscattered light from the inner surface of the cover slip is focused onto a detector 710 held at a fixed z-axis position $z_d$ 712 relative to a focusing lens 714. In FIG. 7B, the mechanical stage has been moved closer to the objective lens, and the distance between the inner interface of the cover slip 702 to the objective lens 706 is now $z_0'$ 720, rather than the initial distance $z_0$ 704 shown in FIG. 7A. The detector 710 in the autofocus module has been moved a corresponding distance away from the focusing lens 714, so that the backscattered light from the inner cover-slip interface 702 remains focused 706 on the detector. Similarly, as shown in FIG. 7C, when the stage is moved further from the objective than in FIG. 7A, with a distance between the inner cover-slip interface and objective of $z_0$' 724, the detector 710 needs to be moved closer toward the focusing lens 714, with the result that the detector and focusing lens are separated by a shorter distance $z_d$" 726, in order than the backscattered light from the inner cover-slip interface remains focused on the detector 706.

A z-axis scan can be carried out not only by moving the stage platform in the z direction relative to the objective lens, but can also be carried out by moving an autofocus-module detector relative to an autofocus-module focusing lens along the optical axis of the autofocus subsystem. When the detector is moved through a range of z positions relative to the focusing lens within the autofocus module, one z position within the range will correspond to the focal point of the focusing lens within the autofocus module, which, in turn, corresponds to the current distance in the z direction between the objective lens and an interface of the cover slip in the optical axis of the optical instrument. Changes in the distance between the objective lens and cover-slip interface, which the autofocus module seeks to detect and correct for, are reflected in changes in the focal length of the focusing lens at which backscattered light from the cover-slip interface is focused onto the autofocus module detector. Thus, a detector that can be physically or logically moved, in the z-axis direction, within the autofocus module with respect to a focusing lens, and that can determine when backscattered light from a cover-slip interface is focused on the detector, can be used to determine a position $z_d$ of the detector relative to the focusing lens, within the autofocus module, corresponding to the current distance $z_o$ between the objective lens and the interface of the cover slip. This allows an absolute value for the distance between the objective lens and cover-slip interface $z_o$ to be determined by the relationship:

$$z_o = -\alpha \frac{1}{z_d}$$

The proportionality constant $\alpha$ can be determined from the geometry of the optical path shared by the autofocus module and optical instrument and characteristics of the autofocus-module focusing lens and the objective lens or lenses of the optical instrument.

Figure 8:
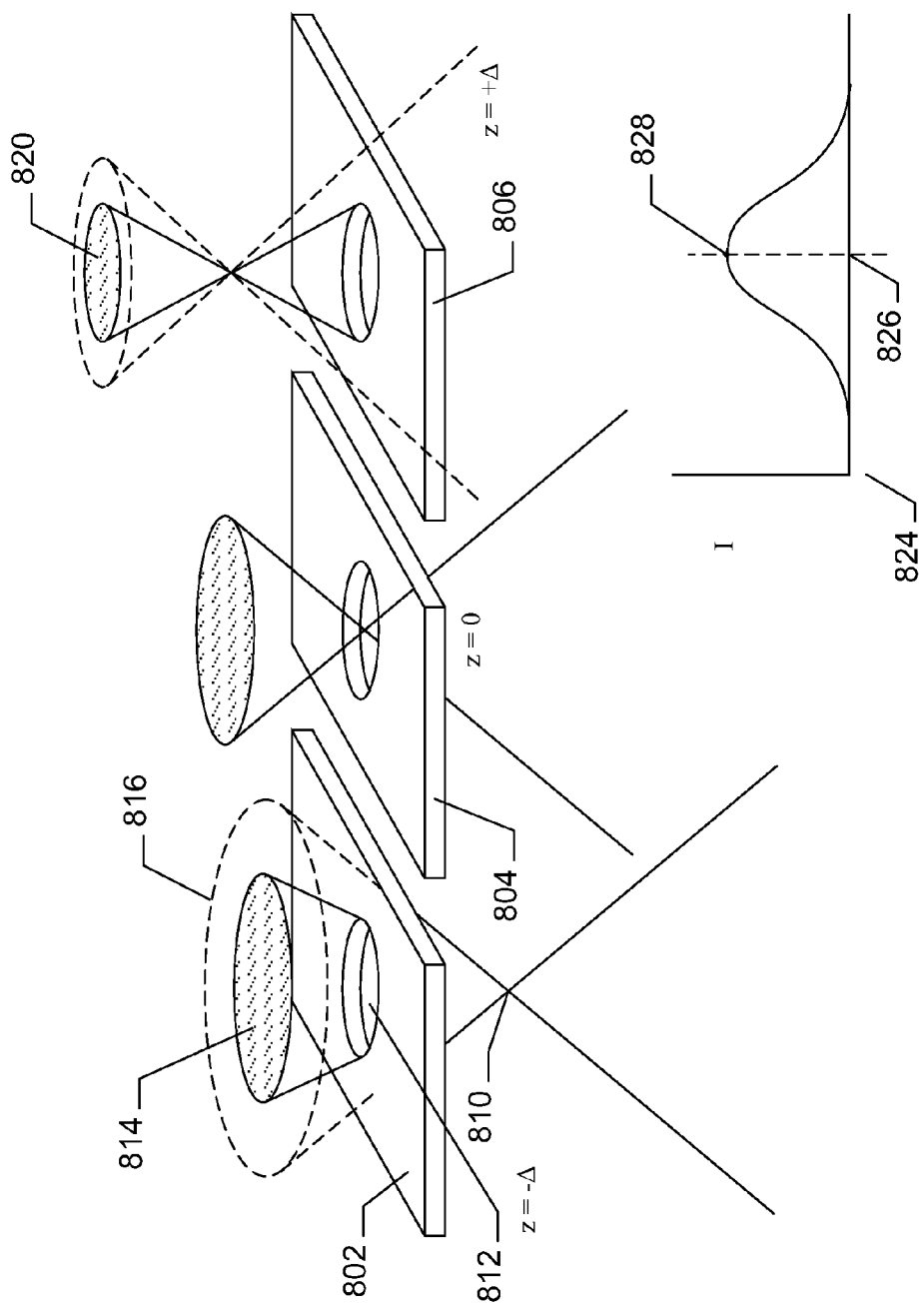
FIG. 8 illustrates a principal of operation of a small-aperture focal-point detector.

FIG. 8 illustrates a principal of operation of a small-aperture focal-point detector. In FIG. 8, a small circular aperture within an opaque material is shown 802, 804, and 806 with respect to three different focused light beams. The first light beam is focused at a point 810 below the circular aperture 812, as a result of which a portion of the light beam falls onto the back side of the opaque material, and only a central conical portion of the light beam with circular cross-section 814 is passed through the circular aperture. Were the light beam not partially blocked by the opaque material, the circular cross-section 816 of the light beam, at the same distance from the focal point as circular cross-section 814, would have a greater diameter and area. Thus, the decrease in intensity of the light after passing through the aperture is proportional to the ratio of the area of circular cross-section 814 to the area of circular cross-section 816. When a light beam is focused at a point coincident with the aperture, as in example 804 of FIG. 8, all of the incident light passes through the aperture and the intensity of the light passed through the aperture is equal to the intensity of the light beam prior to passing through the aperture. When the focal point of the input light falls beyond the aperture, as shown in the third example 806 in FIG. 8, a portion of the input light prior to the focal point falls onto the back side of the opaque material; thus, as in the case 802, only a portion 820 of the focused light beam passes through the aperture. Thus, a photodetector, placed behind a small circular aperture, which measures the intensity of a light beam passing through the small circular aperture can be used to indicate when the focal point of an input focused beam of light falls within the aperture. For example, a plot of the intensity detected by the photodetector versus the z position of a focusing lens relative to the circular aperture reveals the z=0 826 z-axis position of the pinhole aperture relative to the focusing lens at which the light is focused by the focusing lens within the aperture as the point on the horizontal axis of the plot 824 corresponding to the peak of measured intensity 828.

A mechanical drive for moving the detector relative to a focusing lens, as discussed with reference to FIGS. 7A-C, in which the detector comprises a photodetector placed at an appropriate distance behind a pinhole aperture, as shown in FIG. 8, could be used for determining the distance $z_d$ between the pinhole aperture and focusing lens corresponding to the focal point of light backscattered from a cover-slip interface. However, a mechanically movable detector would be expensive, and suffer the same time delays associated with scanning in the z direction by the optical instrument. Rather than using a focal-point detector that can be scanned in the z direction, as in FIGS. 7A-C, U.S. Pat. No. 8,362,409, U.S. Pat. No. 8,558,154 and U.S. Pat. No. 8,759,732 discloses the use of a fixed photodetector and a rotor with pinholes or alternative optical elements for incrementally extending focused beam to carry out repeated z-axis scans. However, the embodiments disclosed therein involves a mechanical arrangement which may be sensitive to wear and which may require maintenance etc.

According to embodiments of the present invention there is provided a focal-point detector without moving parts and which thus is simpler in design and less sensitive to wear etc. Further in the disclosed embodiments, the detection is performed in a parallel mode whereby the determination of the z-position of the stage and the autofocus correction may be significantly faster.

Figure 9A:
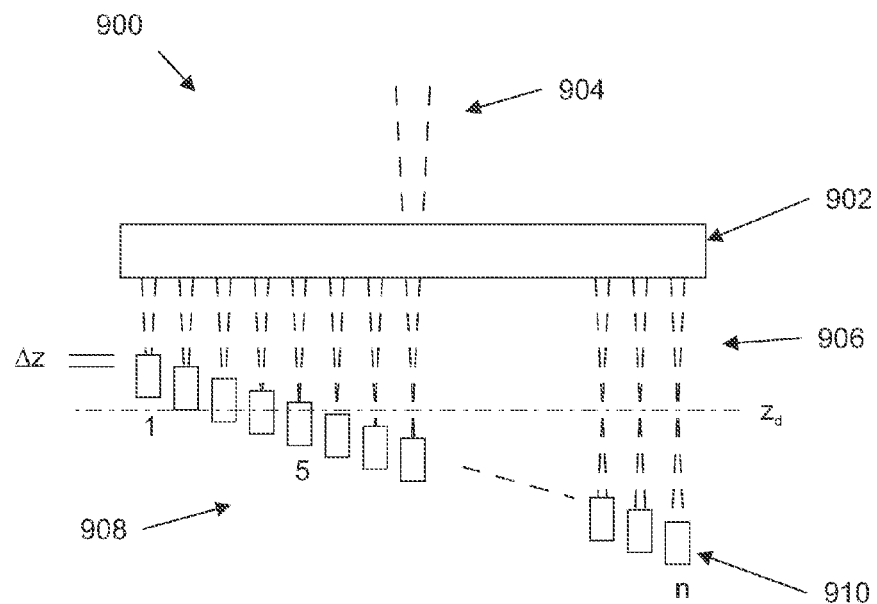
FIGS. 9A-B illustrate an embodiment of an autofocus module in accordance with the present invention.

According to one embodiment, schematically disclosed in FIG. 9a, there is provided a focal-point detector 900, alternatively referred to as autofocus detector, comprising a beam splitter 902 arranged to split the autofocus light beam 904 into a plurality (n) of down-stream light beams 906 and a photodetector arrangement 908 for registering the intensity of each one of the down-stream light beams, and wherein the down-stream light beams are of different optical path lengths measured from the focusing lens to the photodetector arrangement. In this way, the autofocus detector is capable of simultaneously monitoring the intensity of the autofocus light beam at a plurality of different focal distances, to instantaneously detect deviations and fluctuations in the focus position. In order to provide a suitable detection range and resolution, the different optical path lengths of the down-stream light beams are selected so that they span over an autofocus detection range and that the number of the down-stream light beams is suitably high. The autofocus detection range can vary depending on the system configuration but typically may cover the entire thickness of the sample plus an additional buffer thickness to account for initial setup when loading a new sample. In one embodiment, the number of the down-stream light beams is 4 or higher, such as 10, 15, 20 or more. In embodiments with a wide autofocus detection range the number of the downstream light beams is preferably high, and depending on the application it may be 40, 60, 100 or more. As will be discussed more in detail below, it is further possible to increase the resolution of the detection by interpolation to values in-between the fixed distances represented by the down-stream light beams.

For illustrative purposes the beam splitter 902, in FIG. 9a, is schematically disclosed as a functional unit capable of splitting the autofocus light beam 904 into n down-stream light beams 906 wherein the internal optical path length is equal for each down-stream light beam 906. Although, it is not impossible to design a beam splitter of this type, it is envisaged that it would have to be complicated in its design, and as will be disclosed below there may be benefits by designing the beam splitter to provide down-stream light beams 906 of different path lengths. In FIG. 9 the different path lengths of the down-stream light beams 906 is achieved by a relative displacement $\Delta z$ of the respective photodetectors 910 in the photodetector arrangement 908. In FIG. 9a, the photodetector arrangement 908 is illustrated as being comprised of n individual photodetectors 910 wherein each detector is associated with a respective down-stream light beam 906 and wherein each detector is displaced a distance $\Delta z$ with respect to the direction of the down-stream light beam 906 in order to provide a detection range of $n*\Delta z$. In an embodiment with dedicated photodetectors 910, each detector may be small-aperture focal-point type detector as disclosed above. However, as will be discussed in more detail below, in other embodiments the photodetector arrangement 908 may be an integrated detector array of any suitable type, such as a CCD or a CMOS image detector or the like. In FIG. 9a, the autofocus light beam 904 is schematically disclosed as a converging beam which is focused at a focal plane $Z_d$ as previously defined, e.g. by a tube lens 714 of FIG. 7, and the beam splitter 902 is arranged to preserve the confocality to the down-stream light beams 906. The focal plane $Z_d$ is indicated by the dashed line in FIG. 9a.

Figure 9B:
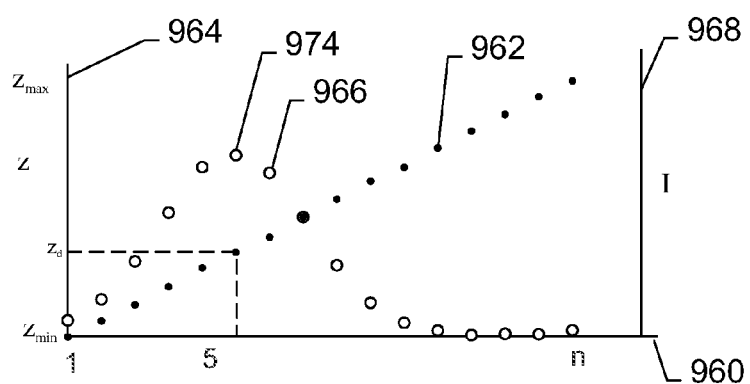

In the plot provided in FIG. 9B, where the different beam path lengths represented by $i*\Delta z$ are plotted over a range of detector indexes i=1 to n with respect to the horizontal axis 960, filled-in circles, such as filled-in circle 962, represent z positions of each beam path length, plotted with respect to a left-hand vertical z-position axis 964, and open circles, such as open circle 966, represent intensity detected by the corresponding photodetector plotted with respect to a right-hand vertical intensity axis 968. As is illustrated by the filled-in circle 962s in FIG. 9B, the z distance increased by increasing detector index I, whereas the intensity detected by the corresponding photodetectors indicated by open circles 966 peaks at 974 corresponding to detector index i=6 and hence the corresponding distance $z_d$ is indicated on the z axis. As previously mentioned, in the present invention the scanning of the z-axis positions of U.S. Pat. No. 8,362,409, U.S. Pat. No. 8,558,154 and U.S. Pat. No. 8,759,732 is replaced by a fixed arrangement of n downstream beams, each representing a different z-axis position. Hence the present invention provides for an essential instantaneous detection of an out of focus state by determination of the corresponding z-axis positions, within an autofocus module that represents one embodiment of the present invention, to determine a distance $z_d$ between a pinhole aperture and focusing lens at which the measured intensity is greatest. That distance is related, as discussed above, to the distance between the objective lens and an interface of the cover slip in the optical instrument.

According to one embodiment, the photodetector arrangement is an array of photodetectors arranged at a predefined photodetector plane, and the beams splitter is comprised of one or more optical elements arranged to generate the plurality of downstream light beams at different path lengths with respect to a predefined photodetector plane. The optical elements of the beam splitter and the detector arrangement may be arranged at fixed positions with respect to each other by attachment to a base structure or the like, or they may be combined to an integral structure wherein some or all components are attached to each other. The beam splitter may be arranged to provide a beam path that is partially or essentially fully implemented in free space (e.g. air) or it may be arranged such that the beam path is partly or essentially fully comprised in an optically transparent material, such as glass, quartz or the like. Optical elements may be manufactured by any conventional manufacturing process such as machining, molding or material deposition or the like.

According to some embodiments, the photodetector arrangement is an array of photodetectors wherein the array of photodetectors is a linear (one-dimensional) or a two-dimensional array with more than 2n photodetectors. By providing a photodetector array with a large number of photodetectors compared to the number (n) of downstream beam paths, the often difficult step of alignment of a photodetector with a respective beam path may be facilitated or completely omitted, e.g. by selecting one or more photodetectors as the most appropriate photodetector(s) in the array as corresponding to the respective down stream light beams, or by binning the registered intensities from two or more photodetectors. Still alternatively, in case the number of photodetectors is significantly larger than the number of down stream light beams, e.g. the photodetector array is an image sensor like a CCD or a CMOS detector unit, the intensities of the respective down stream light beams may be determined using image analysis of the detected image. In such a situation, the resulting images of the respective down stream light beams may overlap each other and the image analysis may e.g. involve peak fitting procedures or the like.

According to some embodiments, one or more of the optical elements of the beam splitter comprises one or more partially reflective interfaces. Beam splitters, comprising a partially reflective interface are widely used in the field of optics to split or combine light beams. Examples of partially reflective interfaces that may be used to provide a beam splitter in accordance with the present invention includes but are not limited to thin reflective coatings of e.g. a metal or the like, provision of a material with suitable refractive index and at a predefined thickness such that frustrated total internal reflection is achieved at the interface or the like. By adjusting the specific material properties, the thickness, and that incident angle of the light beams, the amount of light that is reflected and transmitted may be controlled to a desired level.

Figure 10:
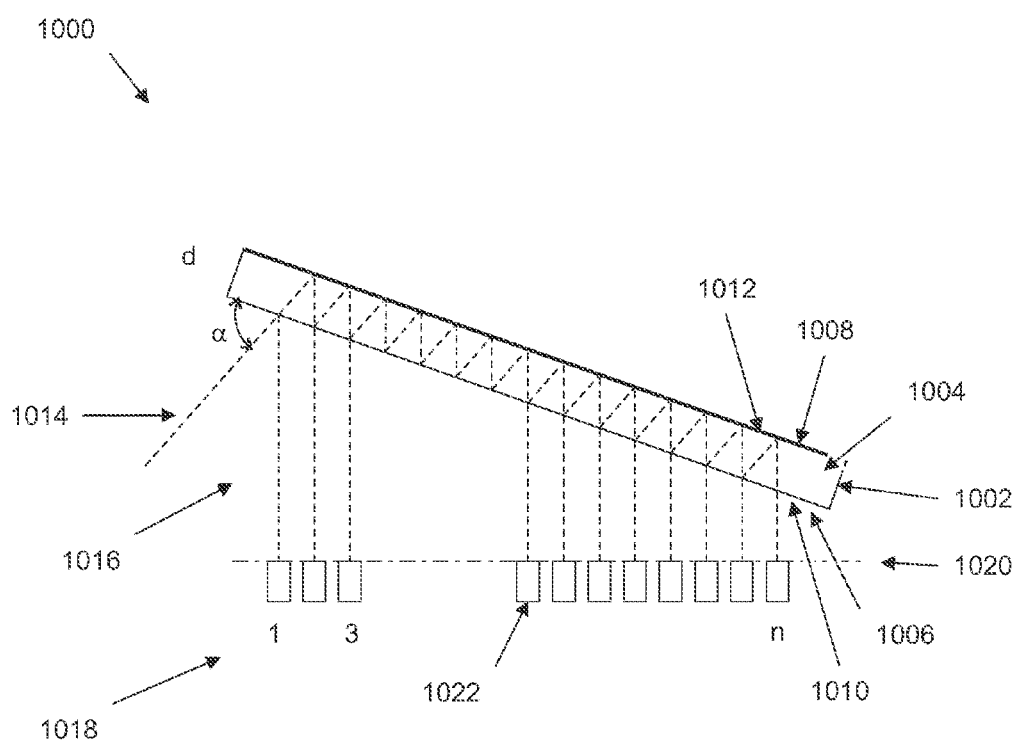
FIG. 10 illustrates another embodiment of an autofocus module.

FIG. 10 discloses one embodiment of an autofocus detector 1000 wherein the beam splitter 1002 is a flat window 1004 made of an optically transparent material of a predefined thickness d with first 1006 and a second opposing faces 1008, and wherein the first face 1006 is provided with a partially reflective interface 1010 and the second face 1008 is provided with a totally reflective 1012 such as a mirror coating. In order to induce multiple internal reflections, the window 1004 is arranged at an angle $\alpha$ with respect to the autofocus light beam 1014. Due to the partial reflective interface at the first face 1006 and the totally reflective 1012 interface of the second face 1008 multiple partial internal reflections are generated in the window 1004 and due to the partial reflective interface 1010 of the first face 1006 multiple down stream light beams 1016 are generated. The down stream light beams 1016 are detected by a photodetector arrangement 1018 at a predefined photodetector plane 1020 schematically disclosed as individual photodetector elements 1022 in FIG. 10, but as discussed above, the photodetector arrangement 1018 may be any suitable detector arrangement such as a CCD or a CMOS detector or the like. In FIG. 10 only the center path of the light beams are shown, and as is illustrated, each subsequent downstream light beam has an additional optical path length achieved by the internal reflections performed. The number of downstream light beams 1016 that are generated by the beam splitter 1002, and the corresponding displacement $\Delta z$ may be determined by selecting the relevant properties of the partially reflective interface 1012, the optical material properties of the window 1004, and the angle $\alpha$. By making proper selections the portions of the light beam intensity outputted to the respective downstream light beams may be controlled to be essentially equal, or otherwise calibration factors may be employed to compensate for any differences in output ratio.

Figure 11A:
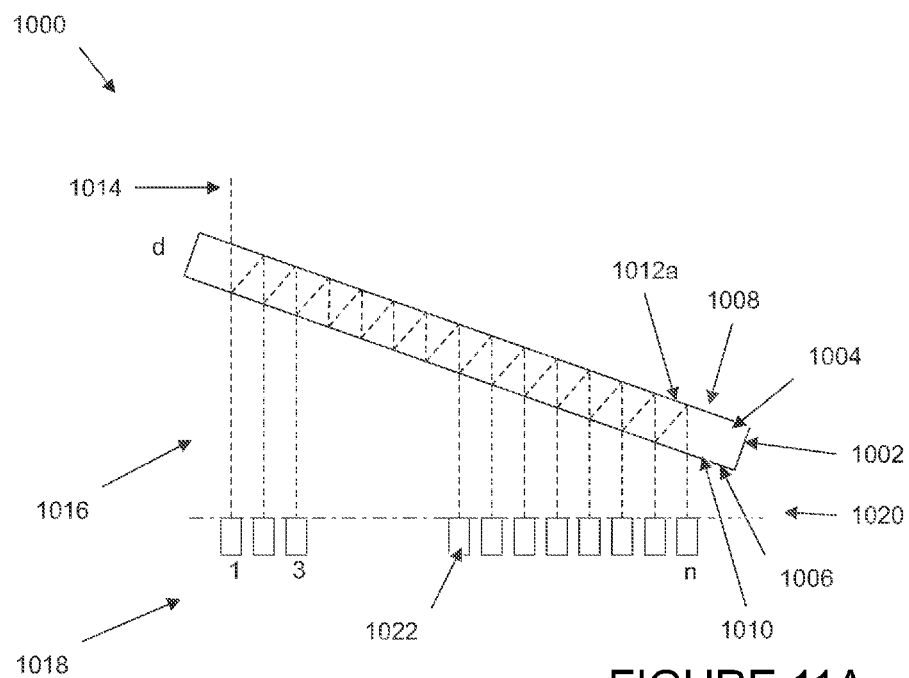
FIGS. 11A and B illustrate yet another embodiment of an autofocus module.
Figure 11B:
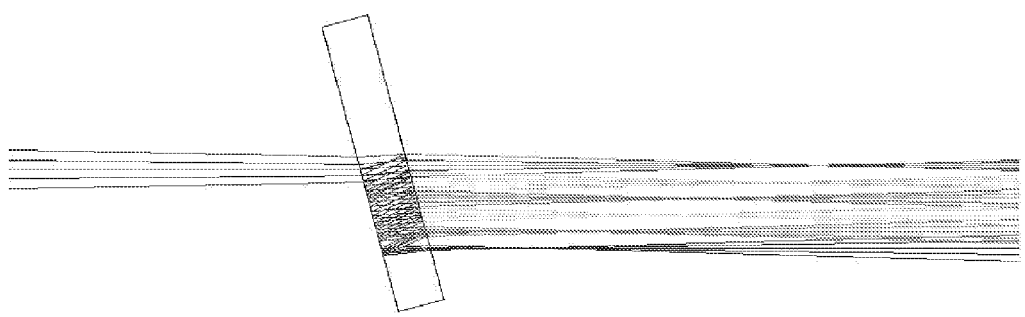
Figure 12:
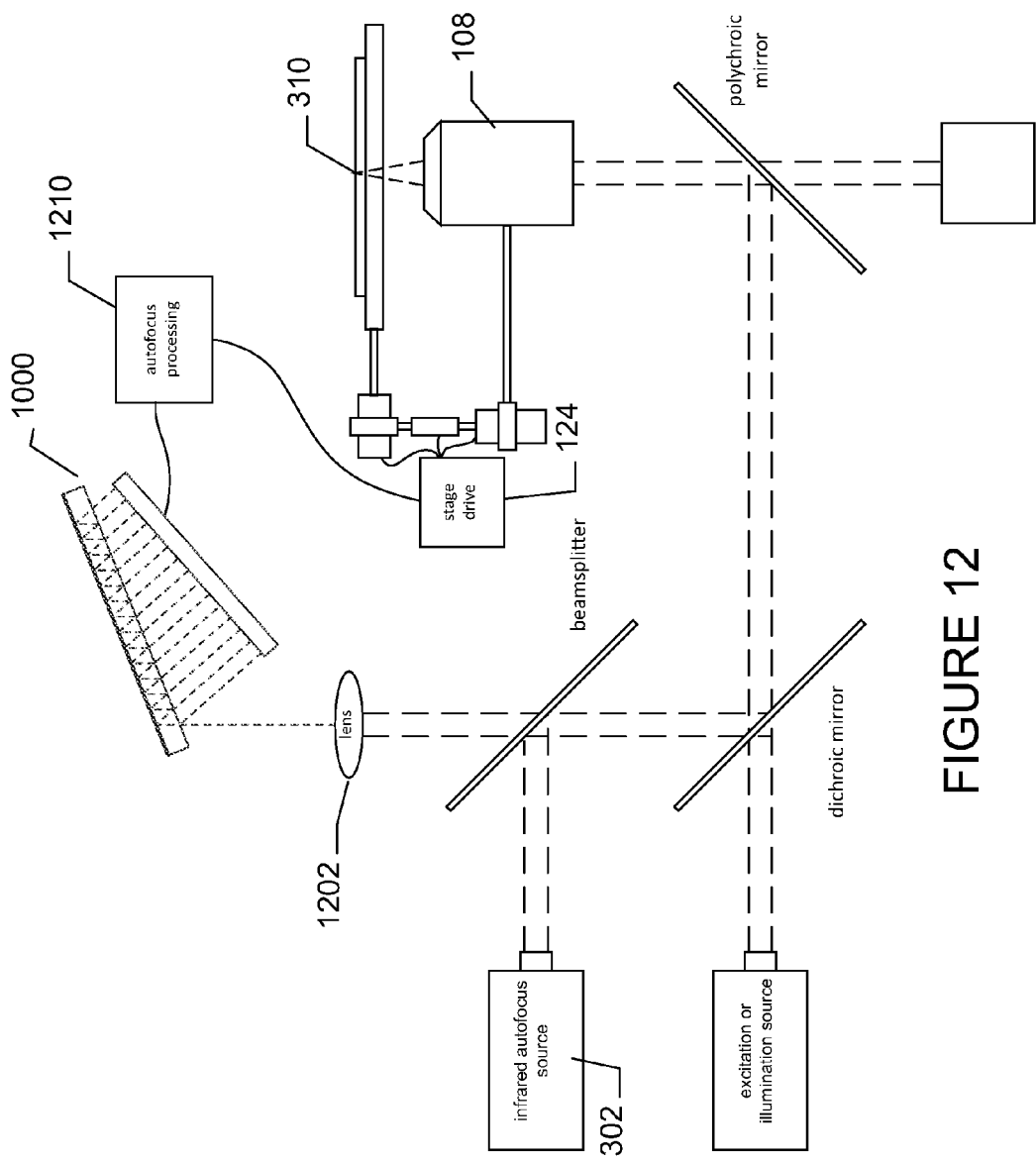
FIG. 12 illustrates an autofocus module that represents one embodiment of the present invention incorporated within the optical path of a fluorescence microscope that also represents one embodiment of the present invention.

FIG. 11a schematically shows a similar embodiment of an autofocus detector 1000 as the embodiment of FIG. 10 wherein the totally reflective interface 1012 has been replaced with a partially reflective interface 1012a whereby the autofocus light beam 1014 may enter through the second face 1008 of the window 1004. FIG. 11b shows a schematic ray trace model of the an autofocus detector 1000 of FIG. 11a FIG. 12 illustrates an autofocus module that represents one embodiment of the present invention incorporated within the optical path of a fluorescence microscope that also represents one embodiment of the present invention. FIG. 12 uses the same illustration conventions as used in FIGS. 1A-C, 3, and 9A-11. The autofocus module includes a focusing lens 1202, an autofocus detector 1000 of the embodiment disclosed in FIG. 10 and an autofocus processing component 1210 The autofocus-processing component 1210 continuously computes $\Delta z$ corrections and issues $\Delta z$ translation directives to the stage drive 124 in order to continuously reposition the mechanical stage so that the distance between the objective lens 108 and cover-slip interface 310 remains constant. As discussed above, while the autofocusing module that represents one embodiment of the invention employs light backscattered from a cover-slip interface, or light backscattered from another interface that has a fixed position relative to the sample, to compute the distance, in the z direction, between the objective and the cover-slip interface, the autofocus module that represents one embodiment of the present invention can be used to stably maintain a focal point of the objective lens with respect to the tube lens and detector of the optical instrument at an arbitrarily selected position within a sample. Again, the phrases "cover-slip interface" and "cover slip" are intended to broadly cover any of the various types of interfaces that can be employed as sources of backscattered autofocus light by an autofocus system. It should be noted that the autofocus modules that represent embodiments of the present invention may be incorporated in various ways into optical instruments. In many cases, the autofocus module may be manually or automatically activated to carry out autofocus for specified or computed periods of time. In other cases, the autofocus subsystem may be activated programmatically, during certain types of image-acquisition modes. In all cases, the autofocus subsystem may be manually or automatically disengaged, during normal z-translations of the optical instrument and at other times.

Figure 13A:
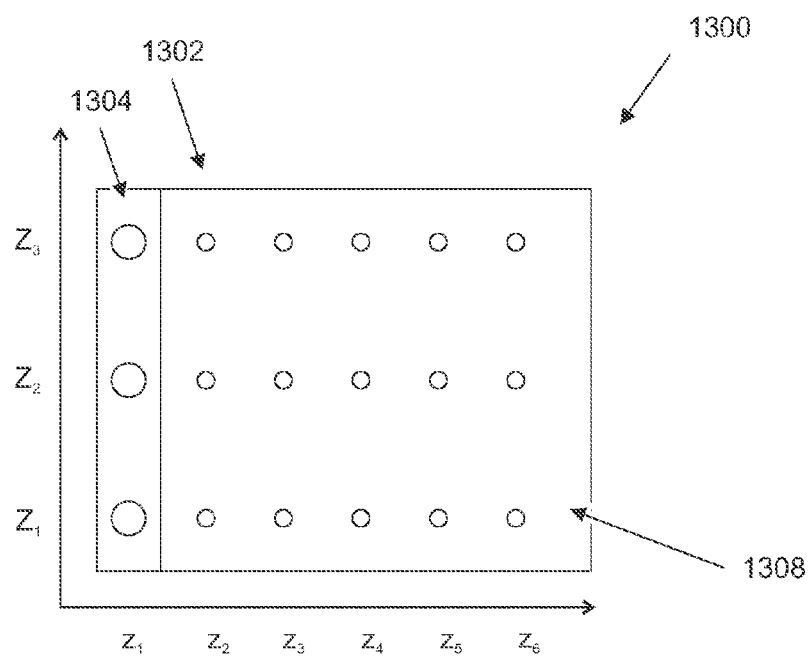
FIGS. 13A and B illustrate yet another embodiment of an autofocus module.
Figure 13B:
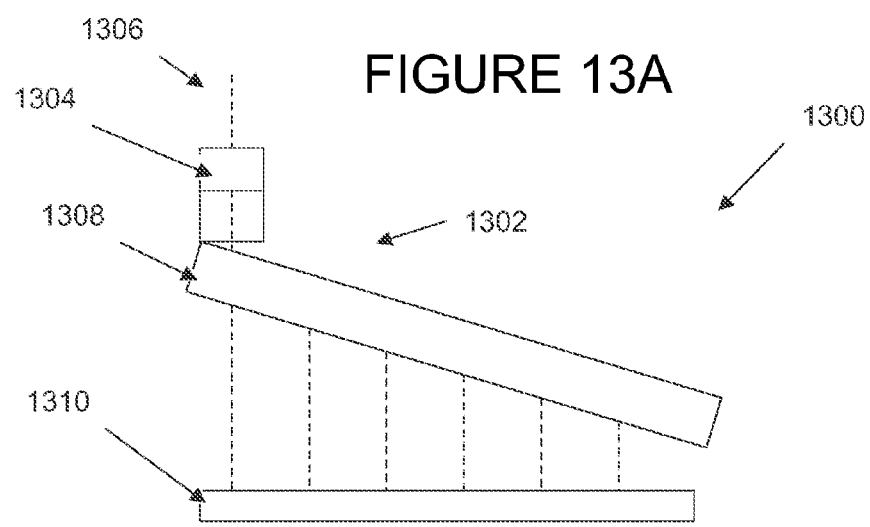

FIGS. 13A and 13B schematically discloses an autofocus detector 1300 arranged to provide a two dimensional pattern of downstream light beams. The two dimensional pattern is provided by a two-step beam splitter arrangement with a first beam splitter 1304 of the same type as beam splitter 1002 of FIGS. 11a and 11b, arranged to split the autofocus beam 1306 into three primary downstream beams $Z_1$ to $Z_3$, and a second beam splitter 1308 of the same type, but of greater width and arranged at a transverse angle with respect to the first beam splitter 1304. The three primary downstream beams $Z_1$ to $Z_3$ are transferred to the second beam splitter 1308 wherein each of the primary downstream beams $Z_1$ to $Z_3$ are split into six secondary downstream beams $z_1$ to $z_6$ giving a total of 18 downstream beams which are projected onto a two dimensional photo detector arrangement 1310 such as a photodiode array, a CMOS camera, a CCD detector or the like. In the disclosed embodiment, the number of downstream beams is limited to 18 for illustrative purposes, but it may be significantly larger, especially in embodiments with a photo detector arrangement 1310 of high resolution. Like mentioned above in association with the related embodiments, the present embodiment is schematically disclosed as separate optical elements, but it may be designed in any suitable way, e.g. by joining several optically transparent elements together and wherein reflective or semi reflective layers etc. may be provided at relevant interfaces.

Figure 14:
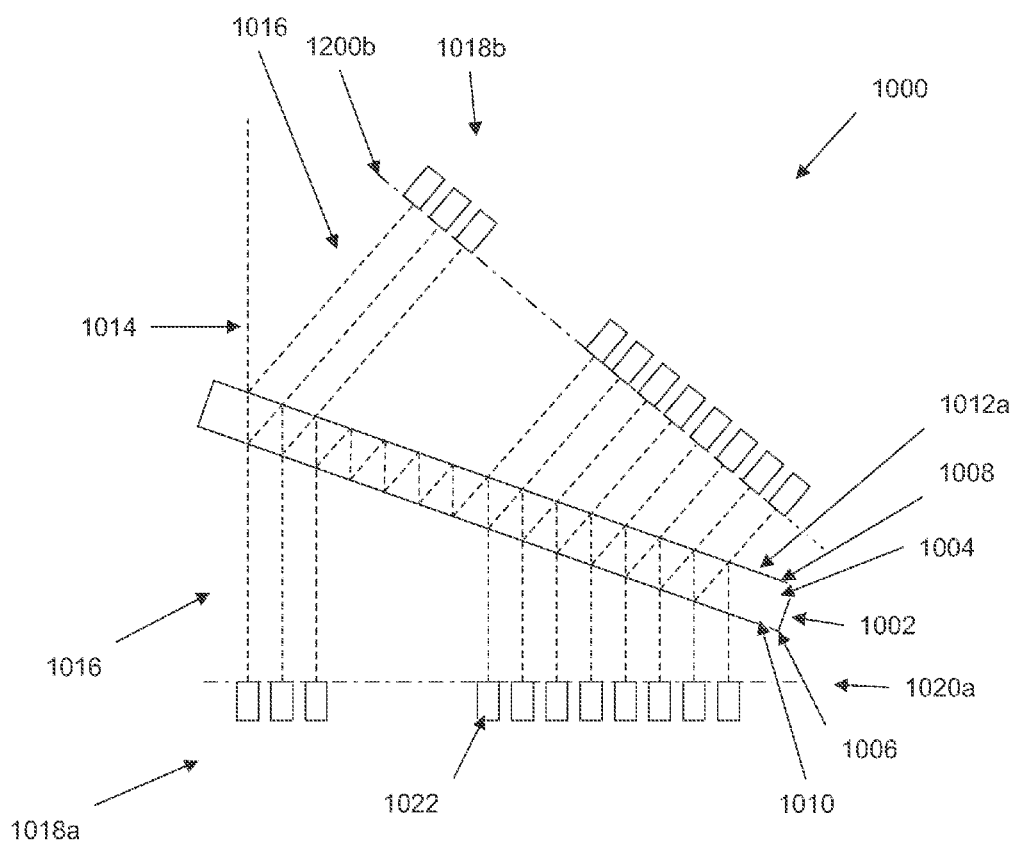
FIG. 14 illustrates another embodiment of an autofocus module.

FIG. 14 schematically shows a similar embodiment of an autofocus detector 1000 as the embodiment of FIG. 11a wherein the partially reflective interface 1012a is arranged to allow transmission of sufficient light to be detected by a second photodetector arrangement 1018b whereby the number of downstream light beams 1016 is essentially doubled and the resolution is improved. As is disclosed, the second photodetector arrangement 1018b is arranged in a corresponding position with respect to the beam splitter 1002 as the first photodetector arrangement 1018a but on the opposite side thereof.

Figure 15:
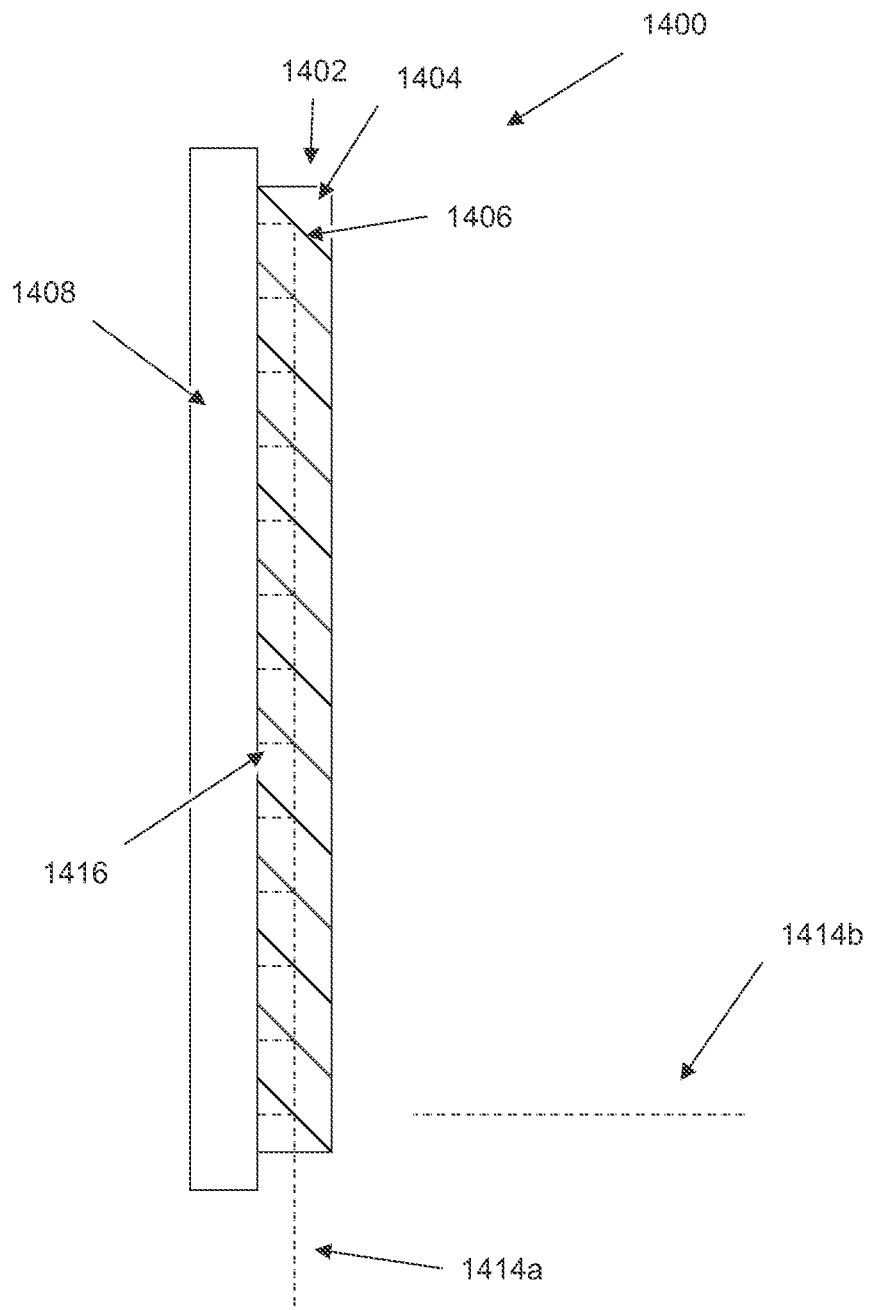
FIG. 15 illustrates another embodiment of an autofocus module.

FIG. 15 schematically shows an embodiment of an autofocus detector 1400 with a beam splitter 1402 comprising a plurality of partially reflective interfaces 1406 arranged at an angle and in series with respect to the autofocus light beam 1414a or 1414b, each partially reflective interface 1406 providing a downstream light beam 1416 that is directed to a photodetector arrangement 1408. In the disclosed embodiment, the plurality of partially reflective interfaces 1406 are schematically disclosed as being integral with a beam splitter body 1404 of an optically transparent material thereby forming an integral optical element 1404 and wherein the beam splitter 1402 is attached to the detector arrangement 1408. In alternative embodiments, the partially reflective interfaces 1406 may be provided as individual partially reflecting mirror elements (not shown). In the disclosed embodiment, the beam splitter 1402 and the photodetector arrangement 1408 are disclosed as an integrated unit, which makes the autofocus detector 1400 very simple and reliable. The photodetector arrangement 1408 may be of any suitable type as discussed above. Moreover, it would be possible to make an integrated three-dimensional beam splitter based on this concept, by arranging some of the initial partially reflective interfaces 1406 to reflect a part of the light beam parallel to the surface of the photodetector arrangement 1408 where after it is provided as input light beam to a subsequent plurality of partially reflective interfaces 1406 to split the autofocus light beam 1414 into a desired number of downstream light beams 1416 that impinges on the photodetector arrangement 1408.

According to one embodiment, the autofocus processing component is arranged to compute, from the recorded intensities of each down-stream light beam, a $Z_d$ position corresponding to a maximum intensity. More in detail the autofocus processing component computes an optical-axis correction $\Delta z$ from the computed corresponding distance, along the optical axis of the optical instrument, from the objective lens of the optical instrument to the point on the optical path at which autofocus light is back-reflected and a desired distance, along the optical axis of the optical instrument, from the objective lens of the optical instrument to the point on the optical path at which autofocus light is back-reflected, and transmits the optical-axis correction $\Delta z$ to an electromechanical component of the optical instrument to maintain the distance, along the optical axis of the optical instrument, from the objective lens of the optical instrument to the point on the optical path at which autofocus light is back-reflected at the desired distance.

U.S. Pat. No. 8,362,409, U.S. Pat. No. 8,558,154 and U.S. Pat. No. 8,759,732 disclose embodiments of how to efficiently compute the current distance between the objective lens and cover-slip interface of a microscope by the autofocus-processing subcomponent of an autofocus module that represents one embodiment of the present invention. This approach may readily be applied to embodiments of the present invention by using the detector index instead of the rotor index to determine the current z position of the stage and need not to be disclosed in greater detail herein.

Although determining the distance from the objective lens to the cover-slip interface by analyzing the intensity of back-reflected autofocus light, as discussed above with reference to graph 324 in FIG. 3, provides one basis for analysis of data, collected by the autofocus photodetector, by the autofocus processing component (1212 in FIG. 12), other approaches are possible. In one alternative approach that represents an alternate embodiment of the present invention, rather than determining the z position at which the intensity of backscattered light is highest, the autofocus system undertakes a calibration operation, at a z position selected by the user of an optical system or by automated program control of the optical system, in which a z-position scan is carried out slightly above and slightly below the selected z position. The purpose of the scan is to identify, in the Gaussian-like intensity curve for the backscattered light from the cover-slip interface, those z positions, and corresponding autofocus-beam positions, corresponding to the steep sides of the Gaussian-like curve. It is in this portion of the Gaussian curve that measured changes in backscattered-autofocus-light intensity are most sensitively dependent on changes in z position of the objective lens with respect to the cover-slip interface. Then, during a data-collection phase following calibration, the changes in intensity measured from the identified autofocus-beam positions are continuously monitored, and the z position is controlled to maintain the calibration-step intensities at those identified autofocus-rotor positions. Thus, in this alternative approach to analysis of autofocus-photodetector-acquired data, the z position of the optical instrument is controlled not as a relative offset to a z position at which backscattered autofocus light is maximally intense, but instead is controlled to maintain a calibration-step-determined intensity for backscattered light measured at those autofocus beam positions which are most sensitive to z-position change. In yet additional embodiments of the present invention, more complex curve-fitting algorithms may be used to precisely fit measured backscattered auto-focus light intensities to an empirically-determined or theoretical backscattered-auto-focus-light-vs.-z-position curve in order to maintain the optical-instrument z position at a desired value.

In another embodiment of the present invention, an additional optical component is introduced into the autofocus system between the infrared autofocus source 302 and the beam splitter 308, or an optical component already within the optical path is tuned or modified, in order to produce a slightly converging or slightly diverging autofocus-light beam, rather than a beam of parallel light rays. By inputting a slightly converging or diverging beam into the optical system, the autofocus light does not end up focused to a point, within the sample. When the autofocus light is precisely focused within the sample, the high intensity of autofocus light may deleterious effect the sample and optical-data collection. For example, when infrared autofocus light is used, highly focused autofocus light may lead to high temperatures within the sample and damage to living cells or temperature-induced changes in the chemical composition of the sample.

In another embodiment of the present invention, a ring aperture is placed between the infrared autofocus source 302 and the beam splitter 308 in order to transmit through the ring aperture only those rays that would be focused at a steep angle by the objective lens toward the cover-slip interface. The percentage of back reflected light is greatest for such steeply angled rays and thus it is possible to reduce the overall amount of incident light on the sample while still maintaining the necessary back-reflected autofocus-light intensity by employing the ring aperture to filter out less steeply angled rays that contribute little to the intensity of the back-reflection.

Although the present invention has been described in terms of particular embodiments, it is not intended that the invention be limited to these embodiments. Modifications will be apparent to those skilled in the art. A variety of different types of autofocus-processing subcomponents can be implemented from logic circuitry or a software-controlled microprocessor in order to continuously compute z position from intensity data collected from the photodetector of the autofocus system by varying any of many design and implementation parameters, including programming language, modular organization, control structures, data structures, and other parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:
1. An autofocus subsystem comprising:
  an autofocus light source;

optical components that direct a light beam from the autofocus light source into the optical path of an optical instrument;

a focusing lens that focuses the autofocus light beam returned to the autofocus system from the optical path of the optical instrument;

an autofocus detector arranged to detect a position $Z_d$ of a focal point of the autofocus light beam along the optical-axis; and an autofocus processing component arranged to adjust the focus of the optical instrument in response to $Z_d$, wherein the autofocus detector comprises a beam splitter arranged to split the autofocus light beam into a plurality (n) of parallel down-stream light beams, wherein n is three or higher, and a photodetector arrangement for registering the intensity of each one of the down-stream light beams, and wherein the down-stream light beams are of different optical path lengths measured from the focusing lens to the photodetector arrangement, wherein the photodetector arrangement comprises an array of photodetectors arranged at a predefined photodetector plane.

2. The autofocus subsystem of claim 1 wherein the different optical path lengths span over an autofocus detection range.

3. The autofocus subsystem of claim 1 wherein each of the plurality of photodetector elements is arranged at a different distance with respect to the beam splitter.

4. The autofocus subsystem of claim 1 wherein the array of photodetectors is a linear array with more than 2n photodetectors.

5. The autofocus subsystem of claim 1 wherein the array of photodetectors is a two dimensional array with more than 2n photodetectors.

6. The autofocus subsystem of claim 1 wherein the array of photodetectors is a two dimensional image sensor.

7. The autofocus subsystem of claim 1, wherein the autofocus processing component is arranged to compute, from the recorded intensities of each down-stream light beam, a $Z_d$ position corresponding to a maximum intensity.

8. The autofocus subsystem of claim 1, wherein the autofocus processing component computes an optical-axis correction $\Delta z$ from a computed corresponding distance, along the optical axis of the optical instrument, from the objective lens of the optical instrument to the point on the optical path at which autofocus light is back-reflected and a desired distance, along the optical axis of the optical instrument, from the objective lens of the optical instrument to the point on the optical path at which autofocus light is back-reflected, and transmits the optical-axis correction $\Delta z$ to an electromechanical component of the optical instrument to maintain the distance, along the optical axis of the optical instrument, from the object lens of the optical instrument to the point on the optical path at which autofocus light is back-reflected at the desired distance.

9. The autofocus subsystem of claim 1, wherein the light source is a laser.

10. The autofocus subsystem of claim 1, wherein the autofocus system includes an additional focusing element that focuses light from the light source to a slightly converging autofocus beam to prevent the light from the light source being focused to a sharp point within a sample by the optical components of the optical instrument.

11. A microscope system comprising an autofocus subsystem of claim 1.

12. The autofocus subsystem of claim 1, wherein the photodetector arrangement is arranged to simultaneously monitor the intensity of each of the down-stream light beams at different optical path lengths.

13. The autofocus subsystem of claim 1, wherein the photodetector arrangement comprises a plurality (n) of photodetector elements, wherein each of the plurality (n) of photodetector element is displaced a distance $\Delta z$ with respect to a direction of its respective down-stream light beam and arranged to provide a detection range of $n*\Delta z$.

14. The autofocus subsystem of claim 1, wherein the photodetector arrangement comprises a CCD or a CMOS image detector.

15. The autofocus subsystem of claim 2, wherein the autofocus detection range cover at least the entire thickness of the sample.

16. The autofocus subsystem of claim 3 wherein the beam splitter comprises one or more optical elements arranged to generate the plurality of downstream light beams at different path lengths with respect to the predefined photodetector plane.

17. The autofocus subsystem of claim 16 wherein one or more of the optical elements comprises one or more partially reflective interfaces.

18. The autofocus subsystem of claim 17 wherein the beam splitter is a flat window made of an optically transparent material of a predefined thickness with first and a second opposing faces, and wherein both faces are partially reflective, the window being arranged at an angle with respect to the autofocus light beam in order to generate a plurality of partial internal reflections and a plurality of down stream light beams exiting the first and second face.

19. The autofocus subsystem of claim 17 wherein the beam splitter is a flat window made of an optically transparent material of a predefined thickness with first and a second opposing faces, and wherein the first face is partially reflective and the second face is totally reflective, the window being arranged at an angle with respect to the autofocus light beam arranged to generate a plurality of partial internal reflections and a plurality of down stream light beams exiting the first face impinging on the predefined photodetector plane.

20. The autofocus subsystem of claim 16 wherein the beam splitter comprises a plurality of partially reflective interfaces arranged at an angle and in series with respect to the autofocus light beam, each partially reflective interface providing a down stream light beam.

21. The autofocus subsystem of claim 16 wherein the beam splitter is provided as an integral optical element and wherein the beam splitter is attached to the photodetector arrangement.

22. The autofocus subsystem of claim 1, wherein light emitted by the light source passes through a ring aperture.

* * * * *